United States Patent
Bloesch

(10) Patent No.: US 8,095,963 B2
(45) Date of Patent: Jan. 10, 2012

(54) SECURING RESOURCE STORES WITH CLAIMS-BASED SECURITY

(75) Inventor: Anthony Christopher Bloesch, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 831 days.

(21) Appl. No.: 12/112,773

(22) Filed: Apr. 30, 2008

(65) Prior Publication Data

US 2009/0276834 A1 Nov. 5, 2009

(51) Int. Cl.
G06F 7/04 (2006.01)

(52) U.S. Cl. ............ 726/4; 726/1; 726/5; 707/781

(58) Field of Classification Search .......... 726/4–5, 726/1; 707/781; 709/229
See application file for complete search history.

(56) References Cited

U.S. PATENT DOCUMENTS

| | | |
|---|---|---|
| 5,581,755 A | 12/1996 | Koerber |
| 5,737,591 A | 4/1998 | Kaplan |
| 5,878,432 A | 3/1999 | Misheski |
| 5,950,209 A | 9/1999 | Carrier |
| 5,978,811 A | 11/1999 | Smiley |
| 6,038,393 A | 3/2000 | Lyengar |
| 6,167,405 A | 12/2000 | Rosensteel |
| 6,173,439 B1 | 1/2001 | Carlson |
| 6,240,416 B1 | 5/2001 | Immon et al. |
| 6,381,743 B1 | 4/2002 | Mitschler |
| 6,460,052 B1 | 10/2002 | Thomas |
| 6,532,588 B1 | 3/2003 | Porter |
| 6,578,037 B1 | 6/2003 | Wong et al. |
| 6,598,219 B1 | 7/2003 | Lau |
| 6,662,188 B1 | 12/2003 | Rasmussen |
| 6,681,382 B1 | 1/2004 | Kakumani |
| 6,745,332 B1 | 6/2004 | Wong et al. |
| 6,874,146 B1 | 3/2005 | Lyengar |
| 6,920,458 B1 | 7/2005 | Chu et al. |
| 6,959,326 B1 | 10/2005 | Day |
| 6,978,281 B1 | 12/2005 | Kruy |
| 6,996,558 B2 | 2/2006 | Dettinger |
| 7,028,057 B1 | 4/2006 | Vasudevan |
| 7,076,496 B1 | 7/2006 | Ruizandrade |
| 7,120,898 B2 | 10/2006 | Grover et al. |
| 7,133,871 B2 | 11/2006 | Sluiman |
| 7,143,091 B2 | 11/2006 | Charnock |
| 7,146,355 B2 | 12/2006 | Chu-Carroll |
| 7,146,606 B2 | 12/2006 | Mitchell |
| 7,155,703 B2 | 12/2006 | Meijer et al. |
| 7,168,063 B2 | 1/2007 | Meijer |
| 7,213,037 B2 | 5/2007 | Rangadass |

(Continued)

OTHER PUBLICATIONS

Office Action dated Nov. 16, 2009 in U.S. Appl. No. 11/749,616.

(Continued)

*Primary Examiner* — Taghi Arani
*Assistant Examiner* — Angela Holmes
(74) *Attorney, Agent, or Firm* — Workman Nydegger

(57) ABSTRACT

The present invention extends to methods, systems, and computer program products for securing resource stores with claims-based security. From policy information, a resource store populates a security table of permissions. The permissions authorize resource access based on received claims. Sessions submit claims to the resource store. The resource store accumulates claims for a session into a claims list. From the claims list and the security table, the resource store filters out a subset of metadata including resource IDs for resources the session is authorized to access. Since the metadata corresponds to the session, any application using the session is given similar access to resources at the resource store.

12 Claims, 6 Drawing Sheets

U.S. PATENT DOCUMENTS

| | | | |
|---|---|---|---|
| 7,349,913 | B2 | 3/2008 | Clark et al. |
| 7,383,255 | B2 | 6/2008 | Desai |
| 7,558,781 | B2 | 7/2009 | Probst |
| 2002/0087665 | A1 | 7/2002 | Marshall |
| 2002/0184194 | A1 | 12/2002 | Yoon |
| 2003/0079107 | A1 | 4/2003 | Booth |
| 2003/0225768 | A1 | 12/2003 | Chaudhuri |
| 2004/0010776 | A1 | 1/2004 | Shah |
| 2004/0088578 | A1* | 5/2004 | Chao et al. ............... 713/201 |
| 2004/0167899 | A1 | 8/2004 | Patadia |
| 2004/0167920 | A1 | 8/2004 | Owen |
| 2004/0186836 | A1 | 9/2004 | Schlesinger |
| 2004/0193594 | A1 | 9/2004 | Moore |
| 2004/0193912 | A1 | 9/2004 | Li et al. |
| 2004/0199867 | A1 | 10/2004 | Brandenborg |
| 2005/0044089 | A1 | 2/2005 | Wu |
| 2005/0050053 | A1 | 3/2005 | Thompson |
| 2006/0026168 | A1 | 2/2006 | Bosworth |
| 2006/0041661 | A1 | 2/2006 | Erikson |
| 2006/0112129 | A1 | 5/2006 | Kostojohn |
| 2007/0055680 | A1 | 3/2007 | Statchuk |
| 2007/0073673 | A1 | 3/2007 | McVeigh et al. |
| 2007/0073776 | A1 | 3/2007 | Kalalian et al. |
| 2007/0156687 | A1 | 7/2007 | Idicula et al. |
| 2007/0192374 | A1 | 8/2007 | Abnous |
| 2007/0208744 | A1 | 9/2007 | Krishnaprasad et al. |
| 2007/0255677 | A1 | 11/2007 | Alexander |
| 2007/0276851 | A1 | 11/2007 | Friedlander et al. |
| 2008/0163332 | A1* | 7/2008 | Hanson ............... 726/1 |
| 2008/0177692 | A1 | 7/2008 | Bloesch |
| 2008/0201330 | A1 | 8/2008 | Bloesch |
| 2008/0320377 | A1 | 12/2008 | Seetharamakrishnan et al. |
| 2010/0325170 | A1 | 12/2010 | Bloesch |

OTHER PUBLICATIONS

Office Action dated Jan. 19, 2010 in U.S. Appl. No. 11/626,815.
Weinberger, Ellis, et al., "A security policy for a digital repository", Oct. 2002, 5 pages.
Bustamente, Michele Leroux, "Building a Claims-Based Security Model in WCF", The ServerSide .NET Your Enterprise .NET Community, Mar. 28, 2007, 10 pages.
Worboys, Geoff, et al., "Firebird File and Metadata Security", Dec. 7, 2005, Document version 0.5, 12 pages.
Ort and Bhakti, Java Architecture for XML Binding, Mar. 2003, pp. 1-12.
McCluskey, Using Java Reflection, Jan. 1998, 99. 1-8.
Haggar, Java Bytecode: Understanding bytecode makes you a better programmer, Jul. 1, 2001, pp. 1-9.
U.S. Appl. No. 11/749,607, Mar. 9, 2010, Office Action.
U.S. Appl. No. 11/749,616, May 6, 2010, Office Action.
Microsoft SOA & Business Process, "Oslo", 2007, 1 page.
MSDN, "Oslo" Repository Architecture, 2009, 23 pages.
Tangsripairoj, Songsri, et al., "Organizing and Visualizing Software Repositories Using the Growing Hierarchical Self-Organizing Map", Journal of Information Science and Engineering 22, 283-295 (2006), Nov. 2005, pp. 283-295.
Rose, Thomas, et al., "Organizing Software Repositories Modeling Requirements and Implementation Experiences", 1992 IEEE, pp. 31-38.
Macchini, Bruno, Reusing Software with ESTRO (Evolving Software Repository), 1992 IEEE, pp. 150-157.
Petro, James, et al., "Model-Based Reuse Repositories—Concepts and Experience", 1995 IEEE, pp. 60-69.
Office Action dated Dec. 17, 2008 in U.S. Appl. No. 11/676,170.
U.S. Appl. No. 11/626,815, Jul. 23, 2010, Office Action.
U.S. Appl. No. 11/676,170, filed Feb. 16, 2007.
U.S. Appl. No. 11/749,616, filed May 16, 2007.
U.S. Appl. No. 11/749,607, filed May 16, 2007.
Neil et al., "A Study of Usability of Web-Based Software Repositories" in: IEEE Software Methods and Tools 2000, Nov. 2000, pp. 51-58.
Viewpoints: A Framework for Integrating Multiple Perspectives in System Development, A. Finkelsetin, J. Kramer, B. Nuseibeh, L. Finkelstein, M. Goedicke, http://www.cs.ucl.ac.uk/staff/A.Finkelstein/papers/ijseke92.pdf (27 pages).
A Framework for Expressing the Relationship Between Multiple Views in Requirements Specification, Bashar Nuseibeh, Jeff Kramer, Anthony Finkelstein, Oct. 1994, http://www.cs.ucl.ac.uk/staff/A.Finkelstein/papers/tse94.icse.pdf (20 pages).
Using Multiple Representations Within a Viewpoint, Nigel James Stranger, Nov. 30, 1999, http://eprints.otago.ac.nz/26/01/Thesis.pdf (496 pages).
Andre Van Der Hoek et al., "A Generic, Peer-toPeer Repository for Distributed Configuration Management," Software Engineering Research Laboratory, Department of Computer Science, University of Colorado, Boulder, Colorado. 1999 IEEE Proceedings of ICSE-18, available at http://delivery.acm.org/10.1145/230000/227786/p308-van_der_hoek.pdf? key1=227786&key2=1334925611&coll=GUIDE&dll=GUIDE&CFID=8075646&CFTOKEN=65412344.
Philip A. Bernstein, et al., "Microsoft Repository Version 2 and the Open Information Model," Microsoft Corporation, One Microsoft Way, Redmond, Washington, available at https://research.microsoft.com/~philbe/Info%20Sys%20on%20MS%20Repository%20for%20Web.pdf.
Edward Sciore, "Versioning and Configuration Management in an Object-Oriented Data Model," VLDB Journal, 3, 77-106, 1994, available at http://www.vldb.org/journal/VLDBJ3/P077.pdf.
Pierre-Alain Muller, Franck Fleurey, Didier Vojtisek, Zoe Drey, Damien Pollet, Frederic Fondement, Philippe Studer and Jean-Marc Jezequel, "On Executable Meta-Languages applied to Model Transformations," [online] Date Unknown, [retrieved on Dec. 4, 2006], pp. 1-48. Retrieved from the Internet: http://www.irisa.fr/triskell/publis/2005/Muller05c.pdf.
Branko Milosavljevic, Milan Vidakovic, Srdjan Komazec and Gordana Milosavljevic, Faculty of Engineering, University of Novi Sad, Yugoslavia "User Interface Code Generation for EJB-Based Data Models Using Intermediate Form Representations," [online] Copyright 2003, PPPJ Jun. 16-18, 2003, Kilkenny City, Ireland, [retrieved on Dec. 4, 2006], pp. 125-128. Retrieved from the Internet: http://delivery.acm.org/10.1145/960000/957327/p125-milosavljevic.pdf?key1=957327&key2=4411925611&coll=GUIDE&dl=GUIDE&CFID=75919783&CFTOKEN=92791900.
Neel Sundaresan and Reshad Moussa, NehaNet Corp., San Jose, California, "Algorithms and Programming Models for Efficient Representation of XML for Internet Applications," [online] WWW10, May 1-5, 2001, [retrieved on Dec. 4, 2006], pp. 366-375. Retrieved from the Internet: http://delivery.acm.org/10.1145/380000/372090/p366-sundaresan.pdf?key1=372090&key2=4204925611&coll=ACM&dl=ACM&CFID=75919783&CFTOKEN=92791909.
Aske Simon Christensen, Anders Moller and Michael I. Schwartzbach, University of Aarhus, Denmark, "Extending Java for High-Level Web Service Construction," [online] ACM Transactions on Programming Languages and Systems, vol. 25, No. 6, Nov. 2003, [retrieved on Dec. 4, 2006], pp. 814-875. Retrieved from the Internet: http://delivery.acm.org/10.1145/950000/945890/p814-s_christensen.pdf?key1=945890&key2=3681925611&coll=ACM&dl=ACM&CFID=75919783&CFTOKEN=92791909.
"What's on the CD?", O'Reilly VB .NET Core Classes in a Nutshell for Visual Studio .NET version 1.0, 2002, pp. 1-6.
U.S. Appl. No. 11/749,607, Aug. 30, 2010, Notice of Allowance.
Venkatrao, SQL/CLI A New Binding Style for SQL, SIGMOD Record, vol. 24, No. 4, Dec. 1995, pp. 72-77.
Office Action dated Jul. 21, 2009 in U.S. Appl. No. 11/676,170.
Office Action dated Aug. 19, 2009 in U.S. Appl. No. 11/749,607.
U.S. Appl. No. 11/749,616, filed Feb. 4, 2011, Office Action.

* cited by examiner

SECURING RESOURCE STORES WITH CLAIMS-BASED SECURITY

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In the real world, individuals typically have a variety of different context specific mechanisms for establishing identity, which are not necessarily interchangeable. Different contexts require different identities, each of which are expressed in a different way and provide different information. For example, a passport can be used at immigration desk to establish identity as a citizen of a particular country. Likewise, a driver's license can be used during a traffic stop to establish identity as a licensed driver. However, a passport typically cannot be used to establish identity as a licensed driver and a driver's license typically cannot be used to establish citizenship.

In network environments, individuals also typically have a variety of context specific mechanisms for establishing a digital identity. Similar to real world identifies, these digital identities are not necessarily interchangeable. Each context can require a different digital identity, which are expressed in a different way and provides different information. Further, digital identities are typical transferred via network communication leading to additional complexities and security concerns.

Digital identities are often authenticated by submitting a user ID and password. If the password matches that assigned to the user ID, a submitting entity is authenticated. Based on the authentication, the submitting entity may be permitted to perform any operations (access content, edit files, mange a server, etc.) that are authorized for the user ID. Authorized operations can be assigned on a per context basis, such as, for example, per organization, etc. That is, for each organization a user can be assigned a user ID and password and can be authorized to perform various operations.

In some environments, permissions to perform operations are controlled using Access Control Lists ("ACL's"). Generally, an ACL is a list of permissions attached to an object, such as, for example, a file. The list specifies who or what is allowed to access the object and what operations are allowed to be performed on the object. In a typical ACL, each entry in the list specifies a subject and an operation: for example, the entry (User1, delete) on the ACL for file XYZ gives User1 permission to delete file XYZ.

Typical ACL-based systems assign permissions to individual users, which can become cumbersome in a system with a large number of users. In other approaches, called role-based access control ("RBAC"), permissions are assigned to roles, and roles are assigned to users. However, either approach still requires the maintenance of ACLs and a checking infrastructure to verify permissions within ACLs.

Further, in some environments resources are accessible via a number of different mechanisms, such as, for example, via different types of applications and/or sessions/connections. Protecting resources using a security model based on ACLs, each different mechanism used to access a resource would typically be required to implement the security model. For example, data in a database can be protected using a security model based on ACLs. Further, the database may be accessible from a variety of tools, such as, for example, a reporting service, a spreadsheet application, etc. Each of these tools must implement the security model of the database, for example, protocols, credential formats, etc., (essentially flawlessly) to authenticate with the database and obtain access to data in the database.

It is also not uncommon for an application to request access to resources from a variety of different providers. Each different provider can implement a different security model, for example, based on ACLs or even using other different types of resource protection. Thus, the application is required to implement the different security model for each different provider to access resources of each different provider. However, depending on network dynamics, intermediate components, available protocols, etc., an application may not necessarily know beforehand what providers it will access. Thus, at the time the application is to be requesting resource access, the application may be required instead to temporarily suspend resource access and configure security settings.

Thus in distributed networking environments, resource access can include efforts to configure applications to match security models of various different resource providers. However, it is often the case that different organizations control applications and resource providers making coordination of these efforts difficult. In some environments, depending on the size of the distributed system (e.g., the Internet), these efforts are essentially unmanageable.

BRIEF SUMMARY

The present invention extends to methods, systems, and computer program products for securing resource stores with claims based security. A resource store receives policy information for the resource store. The resource store derives permissions for accessing secured resources in the resource store from the received policy information. The permissions define secured operations that can be performed on secured resources in the resource store based on received identity information.

The permissions are derived from various policies. The policies can include a secured operations table defining the secured operations that are possible for the resource store. The policies can also include a secured resources table defining the secured resources within the resource store. Each secured resource is a specified resource type, from among a plurality of different resource types. Each of the plurality of different resource types is defined in a secured resource types table.

The resource store receives identity information for a session connected to the resource store. The identity information is accumulated from one or more claims submitted to the resource store on behalf of the session. The resource store determines the resource types that the session can access based on the derived permissions and the received identity information. The resource store accesses a metadata table that maps secured resource identifiers to corresponding resource types. The resource store filters the metadata table into a subset of metadata that includes resource identifiers for secured resources of the resource types the session can access.

In other embodiments, a session is provided access to a secure resource in the resource store. The resource store receives a request over a session connected to the resource store. The request is to perform an operation on secured resources of a specified resource type contained in the resource store. The resource store refers to a claims list for the session. The claims list including claims for the session accumulated from one or more previously received security tokens. Each claim asserts identify information for the session.

The resource store refers to a security table at the resources store. The security table contains permissions for accessing secured resources contained in the resource store. The permissions define secured operations that are authorized for secured resources contained in the resource store based on received identity information.

The resource store determines from the permissions that the connection is authorized to perform the requested operation on secured resources of the specified resource type based on the accumulated claims contained in the claims list. The resource store performs the requested operation for any secured resources of the specified type contained in the resource store.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
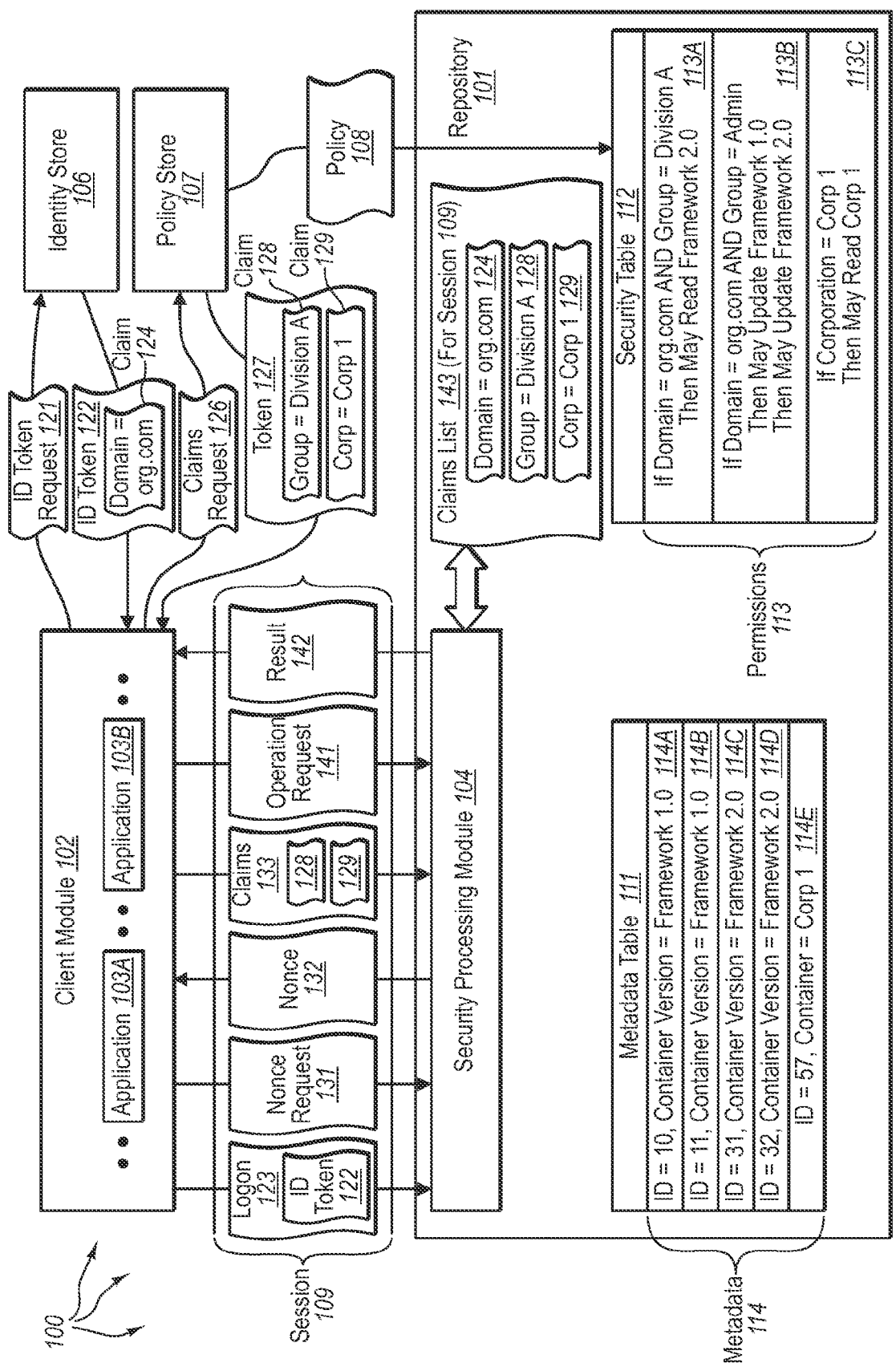
FIG. 1A illustrates an example computer architecture that facilitates securing resource stores with claims-based security

The present invention extends to methods, systems, and computer program products for securing resource stores with claims based security. A resource store receives policy information for the resource store. The resource store derives permissions for accessing secured resources in the resource store from the received policy information. The permissions define secured operations that can be performed on secured resources in the resource store based on received identity information.

The permissions derived from various different policies. The policies can include a secured operations table defining the secured operations that are possible for the resource store. The policies can also include a secured resources table defining the secured resources within the resource store. Each secured resource is a specified resource type, from among a plurality of different resource types. Each of the plurality of different resource types is defined in a secured resource types table.

The resource store receives identity information for a session connected to the resource store. The identity information is accumulated from one or more claims submitted to the resource store on behalf of the session. The resource store determines the resource types that the session can access based on the derived permissions and the received identity information. The resource store accesses a metadata table that maps secured resource identifiers to corresponding resource types. The resource store filters the metadata table into a subset of metadata that includes resource identifiers for secured resources of the resource types the session can access.

In other embodiments, a session is provided access to a secure resource in the resource store. The resource store receives a request over a session connected to the resource store. The request is to perform an operation on secured resources of a specified resource type contained in the resource store. The resource store refers to a claims list for the session. The claims list including claims for the session accumulated from one or more previously received security tokens. Each claim asserts identify information for the session.

The resource store refers to a security table at the resources store. The security table contains permissions for accessing secured resources contained in the resource store. The permissions define secured operations that are authorized for secured resources contained in the resource store based on received identity information.

The resource store determines from the permissions that the connection is authorized to perform the requested operation on secured resources of the specified resource type based on the accumulated claims contained in the claims list. The resource store performs the requested operation for any secured resources of the specified type contained in the resource store.

Embodiments of the present invention may comprise or utilize a special purpose or general-purpose computer including computer hardware, as discussed in greater detail below.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates securing resource stores using claims-based security. Referring to FIG. 1A, computer architecture 100 includes client module 102, identity store 106, policy store 107, and repository 101. Each of the depicted components can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted in FIG. 1A, client module 102 (e.g., an operating system client) includes one or more applications, such as, for example, application 103A, application 103B, etc. From time to time, each of the one or more applications can request access to secured resources at repository 101 (e.g., a SQL database). Client module 102 can be configured to establish a session to repository 101 for use by any of the one or more applications. Client 102 is also configured to request and receive claims from identity providers. Upon obtaining claims for an identity provider, client module 102 can submit claims to relying party, such as, for example, repository 101.

Identity store 106 (e.g., active directory ("AD")) is configured to provide identity information to a client module. In response to an appropriate ID token request, such as, for example, valid credentials, identify store 106 can provide an identity token to a requesting client module. The identity token can include one or more claims with respect to the identity of the client module.

Policy store 107 is also configured to provide identity information to a client module. In response to an appropriate claims request, such as, for example, valid credentials, policy store 107 can provide a token to a requesting client module. The token can include one or more claims with respect to the identity of the client module.

Accordingly, identity store 106 and policy store 107 both include identity provider functionality.

Policy store 107 can also be configured to submit policy information to repository 101. Submitted policy information can include relevant policy information for repository 101, for example, that administrators have set up for repository 101 using policy administration tools. Repository 101 is configured to receive policy information and derive permissions for securing resources from the received policy information. Alternately, administrators can use stored procedures and updatable views to set permissions for accessing secure resources at repository 101. Repository 101 can store permissions, whether they are derived or set through procedures and updatable views, in security table 112.

Security processing module 104 can receive claims and accumulate claims for a client module in a claims list. Received claims can correspond to a specified application at a client module or generally to a session or connection between the client module and repository 101. When claims correspond to a session or connection, security processing module can apply the claims to any application that utilizes the session or connection.

Metadata table 111 includes metadata 114 that maps resource identifiers to various metadata. The resource identifiers can identify secured resources in a storage location at repository 101 (or that repository 101 controls access to). Metadata 114 is used in claims-based security processing to determine if an operation request is authorized for a secured resource.

FIG. 1A, will now be described in more detail. Policy store 107 can send policy 108 to repository 101. From policy 108, repository 101 can derive permissions 113. Repository 101 can then store permissions 113 in security table 112.

Subsequently, an application at client module 102 (e.g., 103A, 103B, etc.) may desire to perform an operation on a secured resource of repository 101. Client module 102 can send ID token request 121 to identity store 106. ID token request 121 can include appropriate credentials such that identity store 106 can authenticate client module 102 as the sender of ID token request 121. Identity store 106 can return ID token 122 to client module 102 in response to receiving token request 121. ID token 122 can include some claims with respect to the (e.g., basic) identity of client module 102, such as, for example, an operating system identity and group memberships. More specifically, claim 124 identifies client 102 as a member of the domain "org.com"

Client module 102 can submit logon 123, including ID token 122, to repository 101. Security processing module 104 can receive logon 123 and extract claim 124 from ID token 122. Security processing module 104 can then exchange further data with client module 102 to establish session 109 between client module 102 and repository 101. Security processing module 104 then establishes claims list 143 for session 143 and inserts claim 124 into claims list 143.

Client module 102 can also request other claims from other identity providers. For example, the application at client module 102 can submit claims request 126 to policy store 107. Claims request 126 can include appropriate credentials such that policy store can authenticate client module 102 as the sender of claims request 126. Policy store 107 can return token 127 to client module 102 in response to receiving claims request 126. Token 127 can include additional claims with respect to the identity of client module 102, such as, for example, further domain or group memberships. More specifically, claim 128 identifies client 102 as a member of the group "Division A" and claim 129 identifies client 102 as a member of Corporation "Corp 1".

In response to receiving further claims, such as, for example, claims 128 and 129, client module 102 can request a nonce from repository 101. For example, client module 102 can submit nonce request 131 to repository 101. Security processing module can receive nonce request 131. In response to nonce request 131, security processing module 104 can return nonce 132 to client module 102.

Nonce 132 is used to minimize the possibility of replay attacks when passing claims. Client module 102 can then combine nonce 132 and claims 128 and 129 into claims 133. Client module 102 can then send claims 133 to repository 101. Claims 133 can be signed and the signing key can be passed in a (e.g., SAML) token to repository 101. Security processing module 104 verifies the token and adds claims 128 and 129 to claims list 143

Figure 1B:
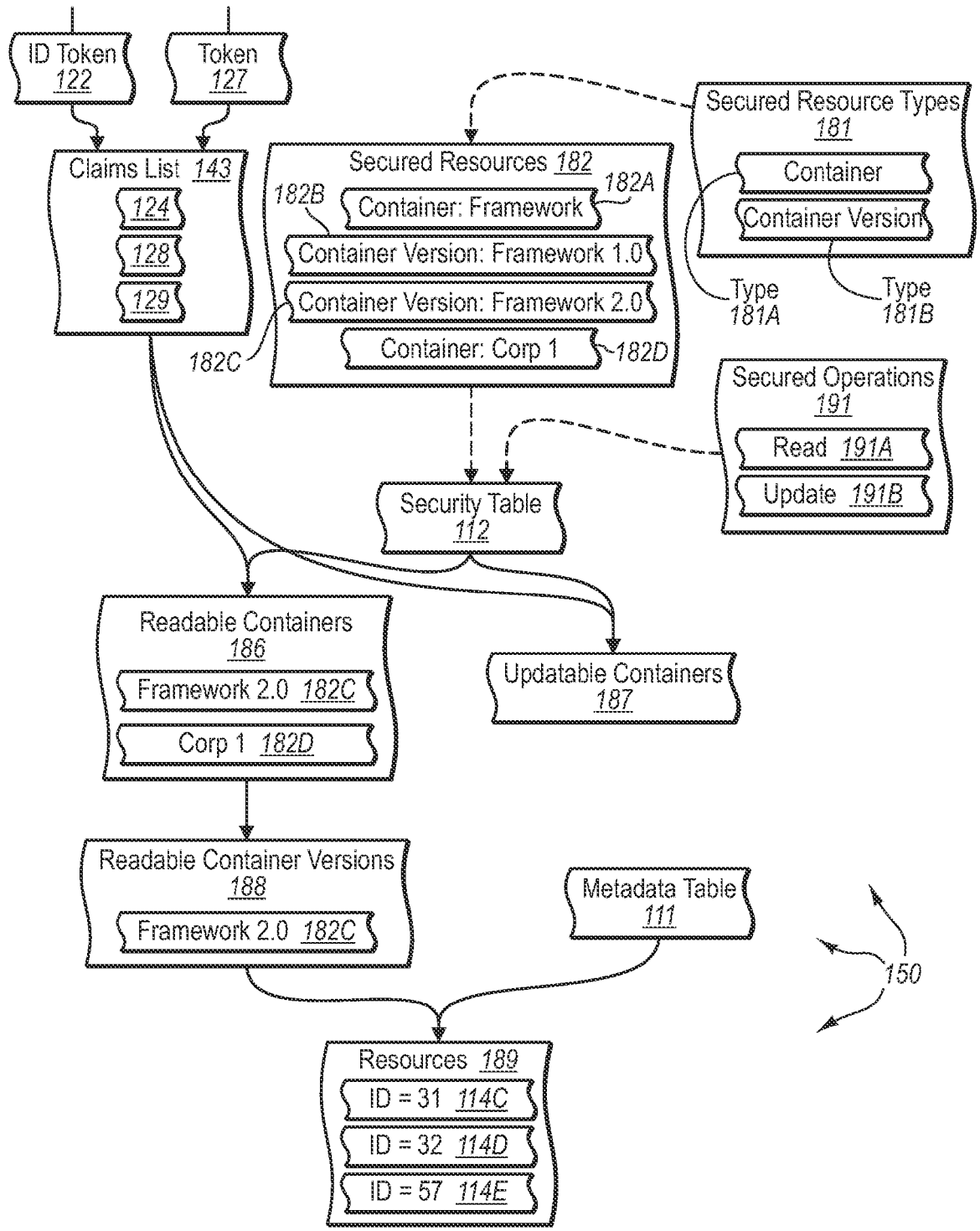
FIG. 1B illustrates an example data flow within the example computer architecture of FIG. 1A for securing resources of a resource store.

Based on the claims list 143, security table 112, and metadata table 111, repository 101 can be secured for session 109. A subset of metadata 114 can be filtered from metadata table 111 representing resources that are accessible to session 109 and corresponding operations session 109 can perform on the accessible resources. Thus, any application (e.g., 103A, 103B, etc.) communicating via session 109 is uniformly afforded the same access to repository 101. FIG. 1B illustrates an example data flow 150 within the example computer architecture of FIG. 1A for securing resources of a resource store.

Figure 2:
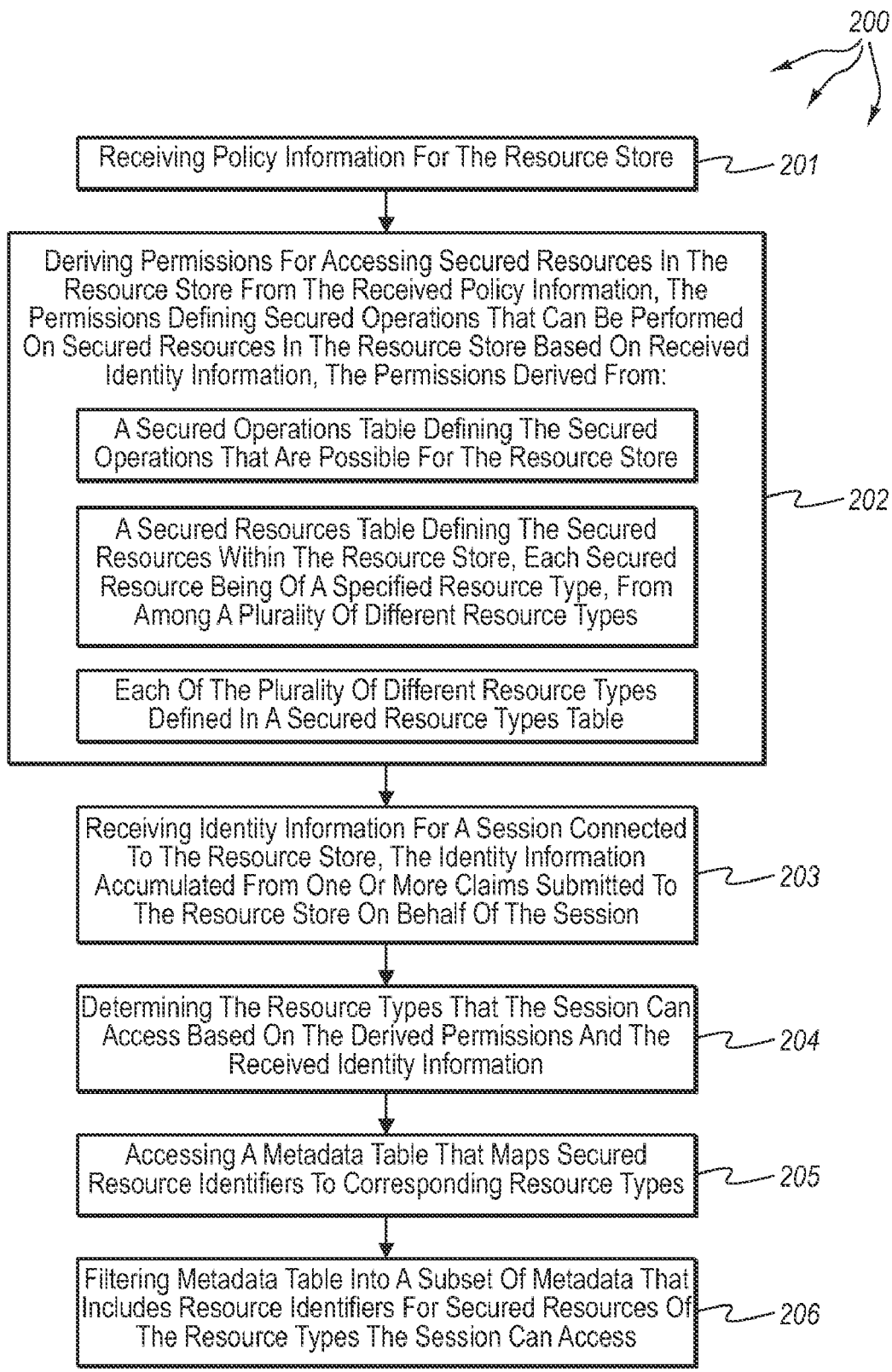
FIG. 2 illustrates a flow chart of an example method for securing a resource store.

FIG. 2 illustrates a flow chart of an example method 200 for securing a resource store. The method 200 will be described with respect to the data in data flow 150 as well as other components and data of computer architecture 100.

Method 200 includes an act of receiving policy information for a resource store (act 201). For example, referring to FIG. 1A, repository 101 can receive policy 108. Within data flow 150, secured resource types 181, secured resources 182, and secured operations 191 can each represent a portion of policy 108. Secured resource types 181 indicates the types of resources, such as, for example, type 181 containers and type 182 container versions, that are that are to be secured at repository 101.

Secured resources 182 indicates specific instances of secured resource types that are to be protected at repository 101. For example, resource 182A represents that repository 101 is to secure containers for a programming framework. Likewise, resource 182D represents that repository 101 is to secure containers for Corp 1. Resource 182B represents that repository 101 is to secure version 1.0 of the programming framework. Similarly, resource 182C represents that repository 101 is to secure version 2.0 of the programming framework.

Secured operations 191 indicate secured operations that can be used at repository 101. Operation 191A indicates that secured resources at repository 101 can be read. Operation 191B indicates that secured resources are repository 101 can be updated.

Method 200 includes an act of deriving permissions for accessing secured resources in the resource store from the received policy information (act 202). For example, permissions 113 can be derived from policy 108. The permissions define secured operations that can be performed on secured resources in the resource store based on received identity information. For example, permissions 113 define read and update operations authorized for secured resources of repository 101 based on received identity information.

The permissions are derived from a secured operations table defining the secured operations that are possible for the resource store. The permissions are also derived from a secured resources table defining the secured resources within the resource store. Each secured resource is a specified resource type, from among a plurality of different resource types. The permissions are derived from each of the plurality of different resource types defined in a secured resource types table. For example, permissions 113 can be derived from secured resource types 181, secured resources 182, and secured operations 191.

Other portions of policy 108 can authorize specified secured operations for specified secured resources based on identity information. For example, other portions of policy 108 can indicate that if domain=org.com AND Group=Division A then may read Framework 2.0. This information can be used to derive permission 113A based on secured resource types 181, secured resources 182, and secured operations 191. Similar derivations can be sued to derive permissions 113B and 113C.

Method 200 includes an act of receiving identity information for a session connected to the resource store (act 203). For example, repository 101 can receive identity information for session 109. The identity information is accumulated from one or more claims submitted to the resource store on behalf of the session. For example, claims list 143 includes claims accumulated from ID token 122 and token 127.

Method 200 includes an act of determining the resource types that the session can access based on the derived permissions and the received identity information (act 204). For example, repository 101 can determine resource types that session 109 can access based on permissions 113 and claims list 143. Readable containers 186 represents the containers that session 109 is authorized to read. For example, session 109 is authorized to read resources in Framework 2.0 (182C) and resources in Corp. 1 (182D). Readable container versions 188 represents versions of containers that session 109 is authorized to read. For example, session 109 is authorized to read resources in Framework 2.0 (182C). However, session 109 is not authorized to read resources in Framework 1.0 (182B).

Updatable resources 187 represents the resources that session 109 is authorized to update. Based on claims list 143 and permissions 113, session 109 is not authorized to update any resources. When appropriate, updateable contain versions (similar to readable container versions 188) may also result.

Method 200 includes an act accessing a metadata table that maps secured resource identifiers to corresponding resource types (act 205). For example, repository 101 can access metadata table 111. Metadata table 111 maps resource identifies to corresponding containers and container versions. For example, metadata 114A maps resource ID=10 to container version 1.0 of container Framework.

Method 200 includes an act of filtering metadata table into a subset of metadata that includes resource identifiers for secured resources of the resource types the session can access (act 206). For example, repository 101 can filter metadata table 111 into resources 189 (metadata 114C, 114D, and 114E). Resources 189 includes resource IDs for resources (e.g., assemblies) in the containers and container versions session 109 can access.

Policy information and security claims can be configured in any of a variety of different ways. In some embodiments, base tables are used for storing claims-based security information. FIG. 1D illustrates example base-tables for storing claim-based security information. Many of the tables in FIG. 1D correspond to and define the format of data in data flow 150. SecuredOperationsTable 177 defines the format secured operations 191. SecuredResourceTypesTable 176 defines the formation for secured resource types 181. SecuredResourceTable 174 defines the format for secured resources 182. SecuredResourcePermissonsTable 172 defines the format for security table 112.

PrincipalSecurtyClaimsTable 171 defines the format for claims list 143. The principal, in PrincipalSecurtyClaimsTable 171 can correspond to a SQL server login SID (i.e., suser_sid( )). Ordinary repository users can be prevented from accessing these tables. SecurityClaimsTypeTable 175 defines the types of claims, such as, for example, an operating system specific, that can be processed. SecurityClaimsTable 173 defines a claim format for claims included in a token.

To increase the efficiency of performing security checks, base tables for storing security information can include a normalized structure. For example, security claims can be factored into their own table.

Referring briefly back to FIG. 1B, adding or removing a container or a container version also adds or removes the corresponding secured resource entries (e.g., in security table 112) via associated triggers and referential actions.

The ability to control the permission set of a group of users as a whole, reduces administration costs and reduces the risk of a user having an incorrect permission set. Since database roles are also principals, groups of principals can be associated with permission sets by adding them to a new database role and adding the role to the permissions table. Windows groups may also be members of database roles or act as principals giving an opportunity to tie a user's permission set to AD maintained information.

Since column level permissions may also be associated with database roles, database roles are a flexible way to control the permissions sets of a group of users.

A set of helper functions can abstract the tasks of finding and changing permissions sets. Inline table valued functions can be used to provide high performance, highly parallelizable implementations of routines that return permission sets for individual principals. In addition, table valued function based implementations provide for future security model extensions by abstracting away the underlying security implementation.

Other embodiments of the invention include determining if a requested operation is authorized. For example, referring back to FIG. 1A, client module 102 can submit operation request 141 to repository 101. Security processing module 104 can receive operation request 141. Operation request can be a request to read or update resources of repository 101.

Figure 1C:
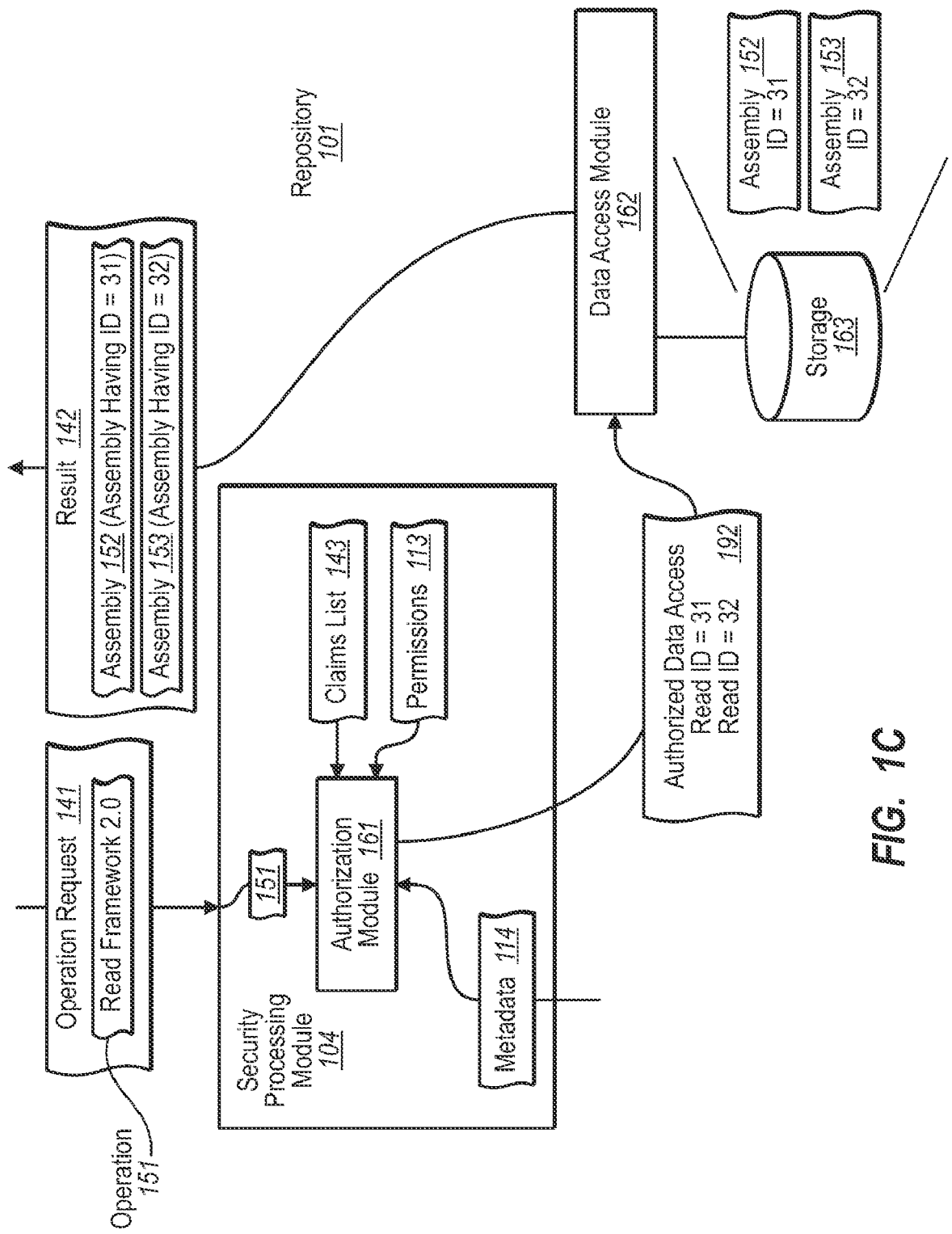
FIG. 1C illustrates other components of the example computer architecture of FIG. 1A.
Figure 1D:
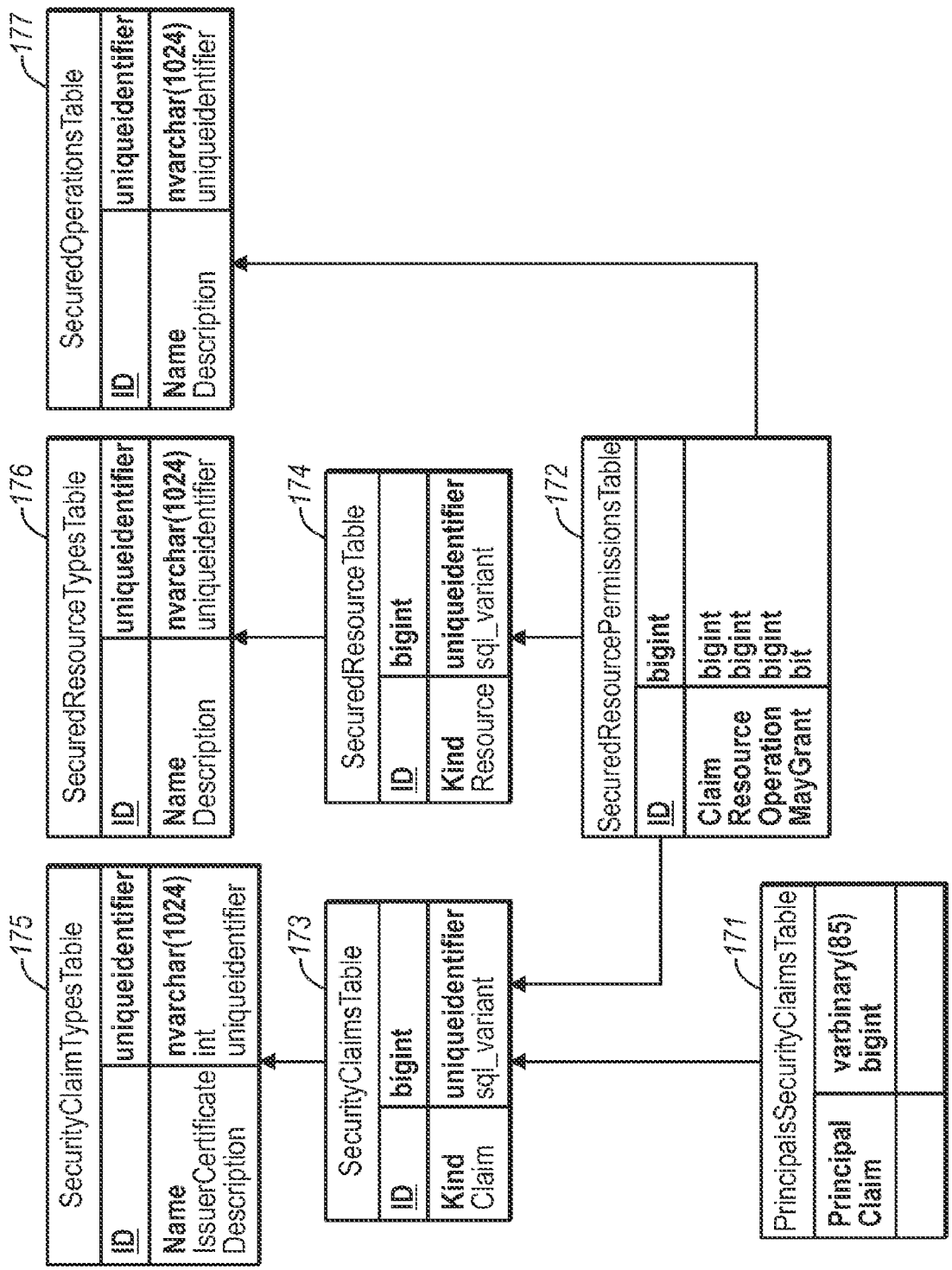
FIG. 1D illustrates example base-tables for storing claim-based security information.

FIG. 1C illustrates other components of repository 101. As depicted in FIG. 1C, security processing module 104 includes authorization module 161. Generally, authorization module 161 can access an operation request from a principal, access a claims list for the principal, access a set of permissions, and access metadata. From the accessed information, authorization module 161 returns an ID for any resource the principal is authorized to perform the operation on.

The list of IDs can be passed to data access module 162. Data access module 162 matches each ID to an identified resource. Data access module 162 then performs the requested operation each identified resource. Data access module 162 can pass the results of the operation (which can include identified resources, for example, for a read operation) to the requesting principal. For example, data access module can return result 142 to client module 102.

Figure 3:
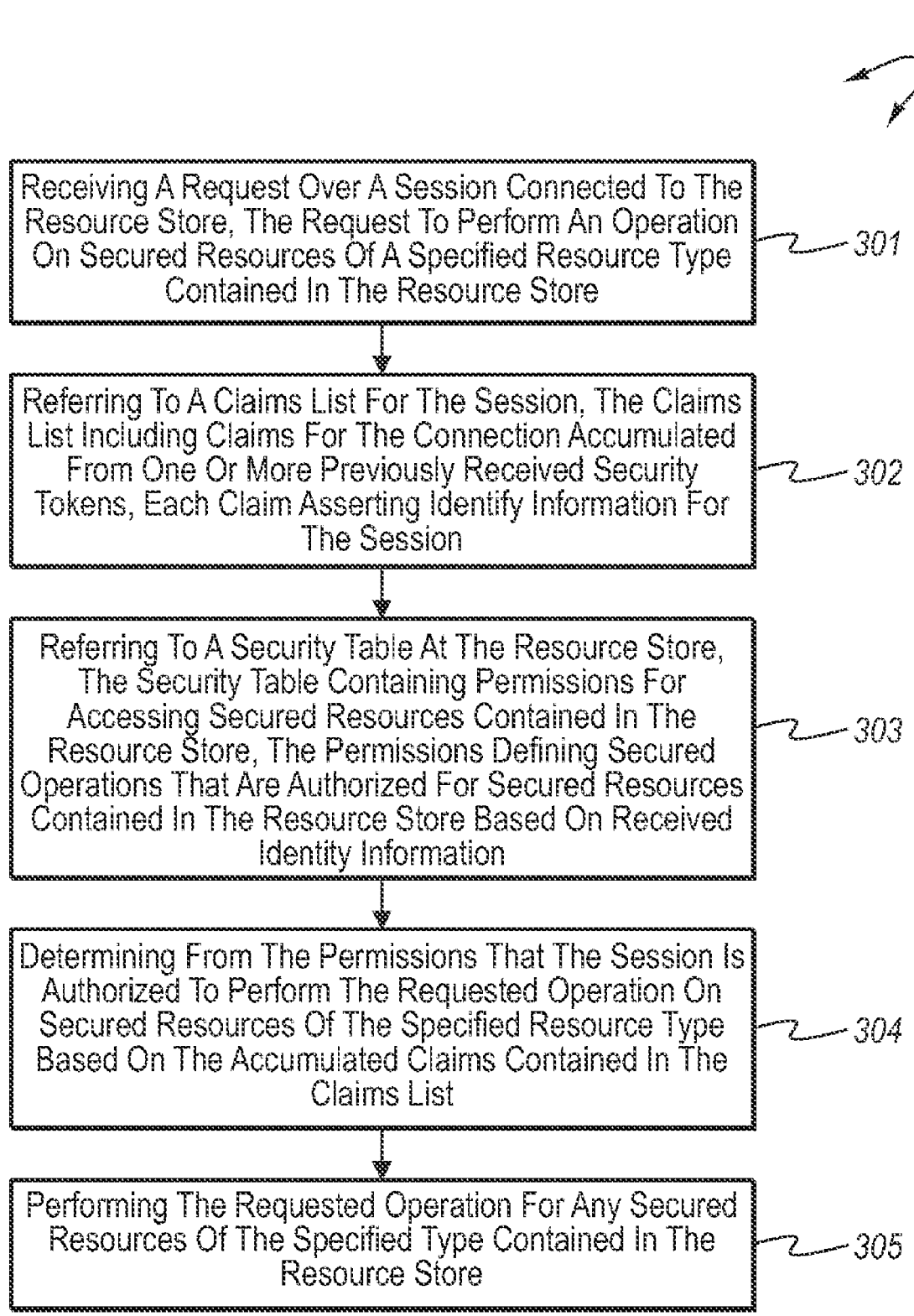
FIG. 3 illustrates a flow chart of an example method for providing secure access to resources in a resource store.

FIG. 3 illustrates a flow chart of an example method 300 for providing secure access to resources in a resource store. Method 300 will be described with respect to the components and data in FIGS. 1A and 1C.

Method 300 includes an act of receiving a request over a session connected to the resource store, the request to perform an operation on secured resources of a specified resource type contained in the resource store (act 301). For example, security processing module 104 can receive operation request 141 over session 109. Operation request 141 is a request to perform operation 151 Read Framework 2.0 (e.g., stored in storage 163). Operation 151 can be forwarded on to authorization module 161 (along with context information identifying session 109).

Method 300 includes an act of referring to a claims list for the session, the claims list including claims for the connection accumulated from one or more previously received security tokens, each claim asserting identify information for the session (act 302). For example, authorization module 161 can refer to claims list 143 for session 109.

Method 300 includes an act of referring to a security table at the resource store, the security table containing permissions for accessing secured resources contained in the resource store, the permissions defining secured operations that are authorized for secured resources contained in the resource store based on received identity information (act 303). For example, authorization module 161 can refer to security table 112.

Method 300 includes an act of determining from the permissions that the session is authorized to perform the requested operation on secured resources of the specified resource type based on the accumulated claims contained in the claims list (act 304). For example, authorization module 161 can determine form permissions 113 that session 109 is authorized to read resources of container Framework version 2.0.

Method 300 includes an act of performing the requested operation for any secured resources of the specified type contained in the resource store (act 305). For example, authorization module can populate authorized data access 192 to indicate that a read operation is to be performed for any resources in Framework 2.0. Referring briefly to metadata 114, this includes ID=31 and ID=32. Thus, authorized data access 192 can indicate that resources corresponding to ID=31 and ID=32 are to be red from storage 163.

Authorization module 161 can pass authorized data access 192 to data access module 162. Data access module 162 can identify resources stored at storage 163 that correspond to ID=31 and ID=32. As depicted in FIG. 1C, this is assembly 152 and assembly 153. Data access module 162 can return assembly 152 and assembly 153 to session 109 in result 142.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system where, during a session, one or more applications are running and the one or more applications require access to resources from a resource store, a method for securing the resources maintained at the resource store with claims-based security, the method comprising the following acts:
   in response to a claims request submitted to a policy store from one or more applications running during the session, receiving from the policy store policy information for the resource store;
   deriving permissions for accessing secured resources in the resource store from the received policy information, the permissions being derived from:
      a secured resources table defining the resources secured within the resource store, each secured resource being of a specified resource type, from among a plurality of different resource types, and each of the plurality of different resource types in turn being defined in a secured resource types table; and
      a secured operations table defining secured operations that are possible for the resources defined in the secured resources table;
   receiving identity information for the session, wherein the identity information is accumulated in a claims list compiled from one or more claims obtained for the session from an identity store and/or the policy store in response to requests submitted by the one or more applications running in the session;
   determining the resource types that any of the one or more applications of the session can access based on the derived permissions and the received identity information as defined by the compiled claims list for the session;
   accessing a metadata table that maps secured resource identifiers to corresponding resource types;
   filtering the metadata table into a subset of metadata that includes resource identifiers for secured resources of the resource types; and
   during the session, providing access to the subset of metadata that includes resource identifiers for secured resources of the resource types by any of the one or more applications of the session.

2. The method as recited in claim 1, wherein receiving from the policy store policy information for the resource store comprises an act of receiving one or more of: an indication of secure resource types at the resource store, an indication of secured resources at the resource store, and secured operations at the resource store.

3. The method as recited in claim 2, wherein receiving policy information from the policy store comprises an act of receiving information that defines data access to resources of the resource store for one or more principals.

4. The method as recited in claim 1, wherein receiving policy information from the policy store comprises an act of receiving policy information formatted in accordance with base tables stored in the resource store.

5. The method as recited in claim 1, wherein receiving identity information for the session comprises an act of receiving identity information contained in an operating system ID token.

6. The method as recited in claim 1, wherein receiving identity information for the session comprises an act of receiving identity information contained in a SAML token.

7. The method as recited in claim 1, wherein the resource store is a database.

8. The method as recited in claim 1, wherein filtering the metadata table into a subset of metadata comprises an act of filtering the metadata table into a subset of metadata identifying resources that the session is authorized to read or update.

9. At a computer system where, during a session, one or more applications are running and the one or more applications require access to resources from a resource store, a computer program product for implementing a method for securing the resources maintained at the resource store with claims-based security,
   the computer program product comprising computer usable memory containing computer-executable instructions for executing the method, and wherein the method is comprised of the following acts:
   in response to a claims request submitted to a policy store from one or more applications running during the session, receiving from the policy store policy information for the resource store;
   deriving permissions for accessing secured resources in the resource store from the received policy information, the permissions being derived from:
   a secured resources table defining the resources secured within the resource store, each secured resource being of a specified resource type, from among a plurality of different resource types, and each of the plurality of different resource types in turn being defined in a secured resource types table; and
   a secured operations table defining secured operations that are possible for the resources defined in the secured resources table;

receiving identity information for the session, wherein the identity information is accumulated in a claims list compiled from claims included with security tokens, one such token indicating a claim for a domain for an operating system ID claim, another token indicating a claim for a group membership in response to requests submitted by the one or more applications running in the session, and the identity information being obtained for the session from an identity store and/or the policy store in response to requests submitted by the one or more applications running in the session;

determining the resource types that any of the one or more applications of the session can access based on the derived permissions and the received identity information as defined by the compiled claims list for the session;

accessing a metadata table that maps secured resource identifiers to corresponding resource types;

filtering the metadata table into a subset of metadata that includes resource identifiers for secured resources of the resource types that one of the one or more applications of the session can access; and during the session, providing access to the subset of metadata that includes resource identifiers for secured resources of the resource types by any of the one or more applications of the session.

10. The computer program product as recited in claim 9, wherein the resource store is a database and wherein one or more of said tokens correspond to a database role.

11. The computer program product as recited in claim 10, wherein the database is a SQL database.

12. The computer program product as recited in claim 11, wherein providing access to the subset of metadata that includes resource identifiers for secured resources of the resource types comprises an act of accessing one or more assemblies form the database.

* * * * *